(12) United States Patent
Kotarski et al.

(10) Patent No.: US 10,612,671 B2
(45) Date of Patent: Apr. 7, 2020

(54) VALVE STEM WITH HEAD COVERED BY COVERING MATERIAL AND METHOD OF MAKING VALVE STEM

(71) Applicant: DSO FLUID HANDLING CO., INC., Irvington, NJ (US)

(72) Inventors: Ed Kotarski, South Brunswick, NJ (US); Joel Cabrera, Kenilworth, NJ (US)

(73) Assignee: DSO FLUID HANDLING CO., INC., Edison, NJ (US)

( * ) Notice: Subject to any disclaimer, the term of this patent is extended or adjusted under 35 U.S.C. 154(b) by 17 days.

(21) Appl. No.: 15/967,388

(22) Filed: Apr. 30, 2018

(65) Prior Publication Data

US 2019/0331232 A1    Oct. 31, 2019

(51) Int. Cl.
| | | |
|---|---|---|
| *F16K 1/36* | (2006.01) | |
| *F16K 41/04* | (2006.01) | |
| *F16K 1/48* | (2006.01) | |
| *B23P 15/00* | (2006.01) | |
| *F16K 1/46* | (2006.01) | |

(52) U.S. Cl.
CPC ............. *F16K 1/36* (2013.01); *B23P 15/001* (2013.01); *F16K 1/46* (2013.01); *F16K 1/487* (2013.01); *F16K 41/04* (2013.01)

(58) Field of Classification Search
CPC ..................................... F16K 1/36; F16K 1/46
USPC ........................................................ 251/357
See application file for complete search history.

(56) References Cited

U.S. PATENT DOCUMENTS

| | | | | |
|---|---|---|---|---|
| 413,518 | A | * | 10/1889 | Jones ...................... F16K 1/487 |
| | | | | 251/88 |
| 2,285,343 | A | * | 6/1942 | Marchand, Jr. ......... F16K 1/385 |
| | | | | 137/243.3 |
| 2,876,982 | A | * | 3/1959 | Snider ....................... F16K 1/36 |
| | | | | 251/88 |
| 3,070,116 | A | * | 12/1962 | Noland ..................... E03B 9/02 |
| | | | | 137/302 |
| 3,099,999 | A | | 8/1963 | Vismara |

(Continued)

FOREIGN PATENT DOCUMENTS

| | | |
|---|---|---|
| CH | 694279 A5 | 10/2004 |
| CN | 2168139 Y | 6/1994 |

(Continued)

OTHER PUBLICATIONS

"High Quality Replacement Parts for the Sanitary Processing Industries," DSO Fluid Handling (8 pages).

*Primary Examiner* — Kevin F Murphy
(74) *Attorney, Agent, or Firm* — Buchanan Ingersoll & Rooney PC (57) ABSTRACT

A valve head engageable and disengageable with a valve seat of a valve comprises a valve body that includes a recess, a disk at one axial end of the recess and a flange at the other axial end of the recess so that the recess is positioned axially between a portion of the disk and a portion of the flange. The outermost portion of the flange extends outwardly beyond the outermost portion of the disk. A covering made of a material different from and more elastic than the material forming the valve body entirely covers the disk. A portion of the covering is positioned in the recess to mechanically connect the covering to the valve body. The outermost portion of the flange is in direct contact with the covering.

12 Claims, 5 Drawing Sheets

(56) References Cited

U.S. PATENT DOCUMENTS

| | | | |
|---|---|---|---|
| 3,227,174 A | 1/1966 | Yost | |
| 4,372,339 A * | 2/1983 | Anderson | E03B 9/04 |
| | | | 137/288 |
| 4,501,407 A * | 2/1985 | Murray | F16K 31/0658 |
| | | | 251/129.15 |
| 4,570,665 A * | 2/1986 | Zimmerly | F16K 41/02 |
| | | | 137/240 |
| 4,759,530 A | 7/1988 | Iff | |
| 5,141,018 A | 8/1992 | Guterman | |
| 6,823,893 B2 | 11/2004 | Hebmulier | |
| 7,537,194 B2 * | 5/2009 | Nagai | F16K 1/38 |
| | | | 251/122 |
| 8,702,056 B2 | 4/2014 | Crochet, Sr. | |
| 9,506,569 B2 * | 11/2016 | Moren | F16K 1/04 |
| 2005/0109974 A1 * | 5/2005 | Antunes Guimaraes | |
| | | | F16K 1/08 |
| | | | 251/357 |

FOREIGN PATENT DOCUMENTS

| CN | 2351632 Y | 12/1999 |
|---|---|---|
| CN | 102661438 A | 9/2012 |
| CN | 102777608 A | 11/2012 |
| CN | 204420239 U | 6/2015 |

* cited by examiner

VALVE STEM WITH HEAD COVERED BY COVERING MATERIAL AND METHOD OF MAKING VALVE STEM

TECHNICAL FIELD

The present invention generally relates to a valve stem that is movable toward and away form a valve seat to close and open a fluid path, and a method of making the valve stem.

BACKGROUND DISCUSSION

Material handling systems such as those used to process food (inclusive of beverages and dairy products), pharmaceuticals, consumer care products and the like, are cleaned or sterilized on a regular basis in order to avoid contamination. The cleaning or sterilization can be "clean-in place" (CIP) or "steam-in-place" (SIP) methods. Such methods involve, rather than disassembling the system for individual treatment of the components, supplying the cleaning or sterilizing products directly through the system at regular intervals. These CIP and SIP methods can clean or sterilize the system more quickly and efficiently than methods requiring disassembly of the system, thus reducing downtime.

CIP and SIP methods may involve the use of harsh cleaning products (e.g., chemicals) and/or may be performed under relatively extreme environments (e.g., high temperature such as encountered during steam cleaning). These harsh conditions can prematurely wear-out components of the system. In particular, for certain applications, it is desirable to use an open/close valve stem in which the head of the valve stem includes rubber material bonded to a metal head. The rubber is an elastic material that is able to seal against the valve seat.

SUMMARY

Figure 1:
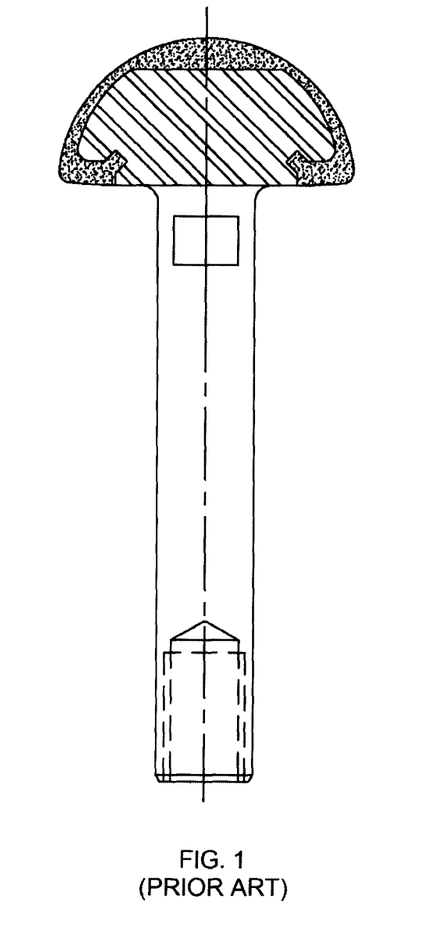
FIG. 1 is a cross-sectional view of a prior art valve stem with rubber material covering the head.

FIG. 1 illustrates an example of a valve stem in which rubber material as the elastic material is injection molded onto the head of the valve stem and vulcanized to the head. The inventors have discovered that the rubber material can degrade relatively quickly due to exposure to CIP or SIP treatment, necessitating replacement of the valve stem within a relatively short time frame. For example, the harsh chemicals and/or extreme conditions to which the valve stem is subjected during CIP/SIP treatment can cause the rubber material to soften somewhat and possibly begin to revert back to its original gum state. This may prevent the head of the valve stem from properly and effectively seating against the seat to produce the necessary seal. Also, pieces of the rubber which may break-off could contaminate the products being processed, a rather significant concern when the product being processed is a food product (e.g., beverage, dairy product, etc.), a pharmaceutical, a consumer care product or the like.

Another factor which may contribute to degradation of the rubber on the head of the valve stem is that the actuator which moves the valve stem into and out of engagement with the seat may apply excessive force when pushing the rubber head into engagement with the valve seat. This application of excessive force can detrimentally impact the integrity of the rubber head which might make it more susceptible to degradation by the harsh conditions of the CIP/SIP system. The rubber head is then not able to effectively seal against the valve seat. To achieve an effective seal, the operator may try to increase the pressure applied by the actuator, but this just further diminishes the integrity of the rubber head.

When the valve stem with the rubber head becomes damaged, the valve stem must be replaced, and so operation of the machine must be stopped. This machine downtime is an undesirable result and is contrary to one reason for implementing CIP/SIP treatment systems, namely minimizing machine downtime.

According to one aspect, a valve stem is movable into engagement with a valve seat of a valve to close a passageway defined by the valve seat and prevent fluid flow through the passageway and movable out of engagement with the valve seat of the valve to open the passageway defined by the valve seat to permit fluid flow through the passageway. The valve stem comprises a one-piece valve body made of metal, with the one-piece metal valve body including a portion that is recessed to define a recess in the valve body, wherein the one-piece metal valve body also includes a disk positioned at one of the axial ends of the recess and a flange positioned at the other of the axial ends of the recess. The recess is positioned axially between a portion of the disk and a portion of the flange, and the outermost portion of the flange extends outwardly beyond the outermost portion of the disk. The valve stem also includes an elongated valve stem connected to the valve body and extending in a direction away from the flange, and a covering made of a material different from and more elastic than the metal forming the one-piece valve body. The covering comprises polytetrafluoroethylene, and the covering comprised of the polytetrafluoroethylene entirely covers the disk. A portion of the covering comprised of the polytetrafluoroethylene is positioned in the recess to mechanically connect the covering to the valve body, and the outermost portion of the flange is in direct contact with the covering comprised of the polytetrafluoroethylene.

Another aspect involves a valve head is engageable with a valve seat of a valve to close a passageway defined by the valve seat and prevent fluid flow through the passageway and movable to be disengaged from the valve seat of the valve to open the passageway defined by the valve seat to permit fluid flow through the passageway. The valve head comprises a valve body made of a first material and including a dome-shaped portion, a cylindrical portion and a flange portion, with the cylindrical portion being positioned axially between the dome-shaped portion and the flange portion. The outermost diameter of the dome-shaped portion is greater than the outermost diameter of the cylindrical portion and less than the outermost diameter of the flange portion. The dome-shaped portion is disposed at a first end of the cylindrical portion and the flange portion is disposed at a second end of the cylindrical portion opposite the first end so that the cylindrical portion is positioned axially between the dome-shaped portion and the flange portion. The valve head also comprises a covering made of a second material that is more elastic than the first material, with the covering being connected to the valve body and entirely covering the domed-shaped portion and the cylindrical portion.

Another aspect involves a method of making a valve component configured to engage a valve seat of a valve to close a passageway defined by the valve seat and to disengage the valve seat of the valve to open the passageway defined by the valve seat. The method comprises compression molding a covering onto a valve body made of a first material, with the valve body made of the first material comprising a dome-shaped portion, a cylindrical portion and a flange portion, and wherein the cylindrical portion is positioned axially between the dome-shaped portion and the flange portion. The compression molding of the covering onto the valve body comprises compression molding a second material onto the valve body made of the first material so that the second material is in direct contact with the flange portion and entirely covers the domed-shaped portion and the cylindrical portion of the valve body, with the second material being more elastic than the first material. The method additionally involves sintering the second material after the compression molding to bond the second material to the valve body.

In an embodiment, the first material comprises steel.

In an embodiment, the second material comprises PTFE.

In an embodiment, the valve body further includes a connection portion disposed at the second side of the cylindrical portion, the connection portion connecting the valve head to the valve stem.

In an embodiment, the connection portion comprises a hollow cylinder defining a female thread.

In an embodiment, the connection portion comprises a hollow cylinder defining a female thread threadedly connected to a male thread of the valve stem.

In an embodiment, an outer peripheral portion of the flange portion is bent or curved toward the second material.

In an embodiment, the compression molding involves compressing the second material into a channel defined by the flange portion, the cylindrical portion, and a flat face of the dome-shaped portion.

DETAILED DESCRIPTION

Hereinafter, embodiments of a valve stem representing examples of the inventive valve stem disclosed here are described with reference to the accompanying drawing figures. The same reference numerals are given to common members in each drawing.

Figure 3:
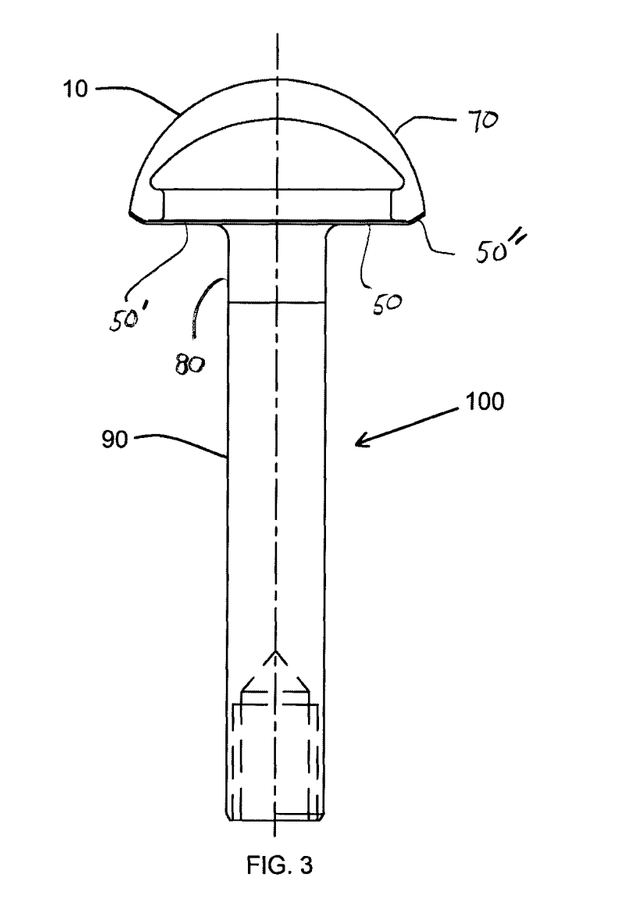
FIG. 3 is a cross-sectional view of a valve stem according to an embodiment of the present application.

Generally speaking, the valve stem disclosed here is comprised of an elongated stem and a head (valve head), with the elongated stem having one end connected to the valve head. FIG. 3 generally depicts a valve stem 100, and shows an elongated stem 90 that is connected to a valve head 10.

Figure 2:
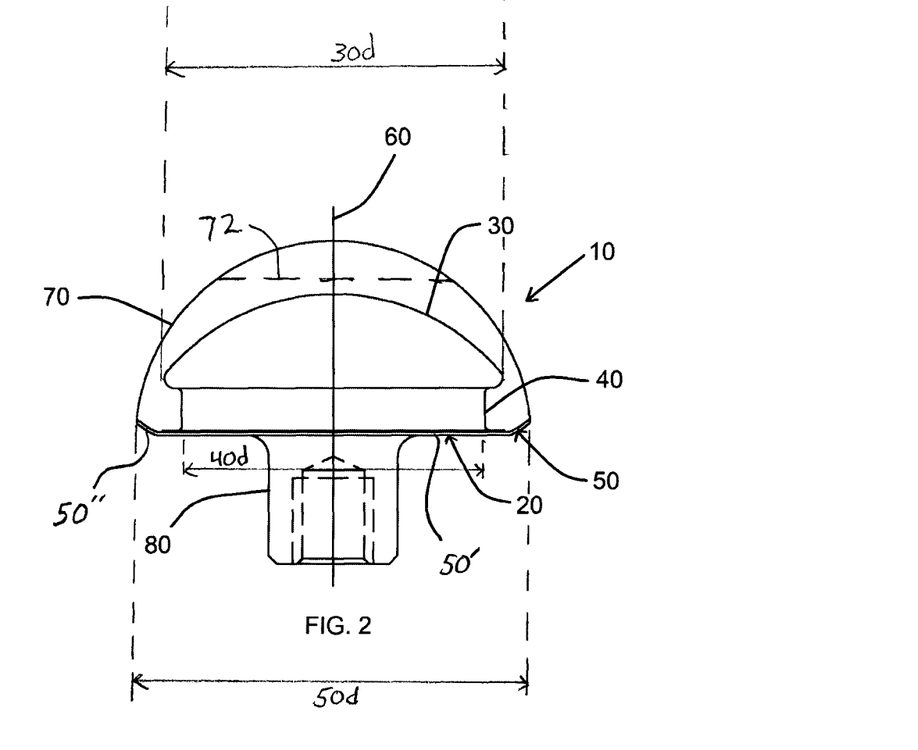
FIG. 2 is a cross-sectional view of a valve head for use with a valve stem according to an embodiment of the present application.

FIG. 2 illustrates the valve head 10 according to one disclosed embodiment. The valve head 10 includes a valve body 20 having a dome-shaped portion 30 (hemispherically-shaped portion), a cylindrical portion 40, and a disc-shaped flange portion 50, each of which is centered along a longitudinal axis 60 of the valve head 10. The dome-shaped portion 30, the cylindrical portion 40, and the disc-shaped flange portion 50 are preferably integrally formed of the same material at the same time so that the valve body 20 is a one-piece body. The dome-shaped portion 30 has an outermost diameter (outermost lateral dimension "30*d*") greater than the outermost diameter outermost (lateral dimension "40*d*") of the cylindrical portion 40 and less than the outermost diameter (outermost lateral dimension "50*d*") of the disc-shaped flange portion 50. The dome-shaped portion 30 is disposed at a first side (axial end) of the cylindrical portion 40 and the disc-shaped flange portion 50 is disposed at a second side (axial end) of the cylindrical portion 40 opposite the first side. The cylindrical portion 40 is thus positioned axially between the dome-shaped portion 30 and the disc-shaped flange portion 50. As discussed in detail below, this configuration allows the covering 70 made of a material more elastic than the material of the valve body 20 to be bonded or connected, specifically mechanically bonded/connected, to the valve body 20 while entirely covering the domed-shaped portion 30 and the cylindrical portion 40.

The description above explains that the covering 70 of the valve head 10 may be dome-shaped or hemispherically-shaped. But the valve stem is not limited in this manner. For example, the covering 70 of the valve head 10 may possess a truncated dome-shape or a truncated hemispherical-shape. That is, with reference to FIG. 2, the top central portion of the covering 70 can be removed (as indicated by the dotted line 72 in FIG. 2), so long as the outer periphery of the remaining portion of the covering 70 possesses a curved shape like that shown in FIG. 2 to engage the valve seat and seal against the valve seat (i.e., the region of contact between the covering 70 and the valve seat is circular/annular in shape). One reason for removing a portion of the covering in this way is to save material in a region where the shape of the covering 70 is not so significant and does not contribute to sealing. A similar configuration may be adopted for the dome-shaped portion 30 (hemispherically-shaped portion) of the valve body 20. That is, with reference to FIG. 2, the top central portion of the portion 30 may be removed so that the portion 30 possesses a truncated dome-shape or a truncated hemispherical shape.

In the valve head 10 of the FIG. 2 embodiment, a connection portion 80 includes a hollow cylinder defining a female thread (an internal thread in the hollow cylinder). The connection portion 80 projects axially away from the disc-shaped flange portion 50, is disposed at the second side of the cylindrical portion 40 and is configured to connect the valve head 10 to the elongated stem 90 at the second side of the cylindrical portion 40. The elongated stem 90 may include a male thread at one end to threadably engage the female thread of the connection portion 80 to thus connect the elongated stem 90 to the head 10 to form a valve stem 100 constituted by the valve head 10 and the elongated stem 90, as illustrated in FIG. 3. After the elongated stem 90 is threadably engaged with the connection portion 80 of the valve head 10, the elongated stem 90 is welded, for example by orbital welding, to the connection portion 80. In alternative embodiments, the valve head and the elongated stem may be formed as an integral, one-piece valve stem with no threaded engagements an no welding.

The valve body 20 is preferably made of a relatively hard material while the covering 70 is made of a relatively elastic material having more elasticity than the valve body 20. According to one disclosed embodiment, the valve body 20 (i.e., the dome-shaped portion 30, the cylindrical portion 40, and the disc-shaped flange portion 50) is made of steel, preferably stainless steel, while the covering 70 is made from PTFE (polytetrafluoroethylene). The material forming the covering 70 is elastic in the sense that the covering 70 is compressible during use when the valve head (covering 70 of the valve head) is pressed against a valve seat of the valve and is able to return toward, and perhaps to, its original shape when the valve head (covering 70 of the valve head) is moved away from the valve seat so that the covering 70 is spaced from the valve seat. The covering 70, in addition to exhibiting the desired elasticity that allows the covering 70 to seat against the valve seat, is resistant to the harsh chemical and/or temperature environment found in CIP or SIP systems. In the present application, the term PTFE includes virgin PTFE, modified PTFE, or blends thereof. Modified PTFE has been found to be a preferred material. An example of modified PTFE is T-Smart® supplied by T-Lon Products, Inc., which is more resilient than virgin PTFE, thus making the modified PTFE possibly more preferred compared to virgin PTFE in view of the environment in with the modified PTFE is used (i.e., creating a seal). An example of a blend is the modified PTFE/stainless steel blend marketed as Tef-Steel® supplied by DSO Fluid Handling Co., Inc., which is stronger than virgin PTFE.

Figure 4A:
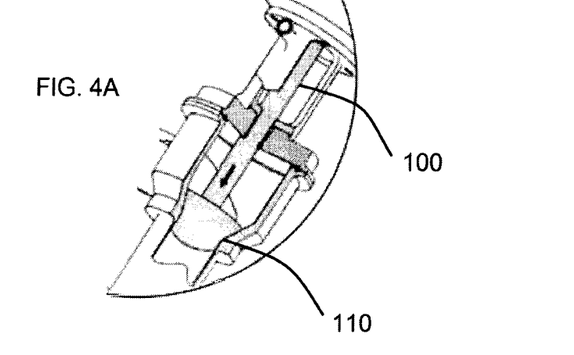
FIGS. 4A and 4B are perspective views of a valve stem according to an embodiment of the present application used in a fluid handling system.
Figure 4B:
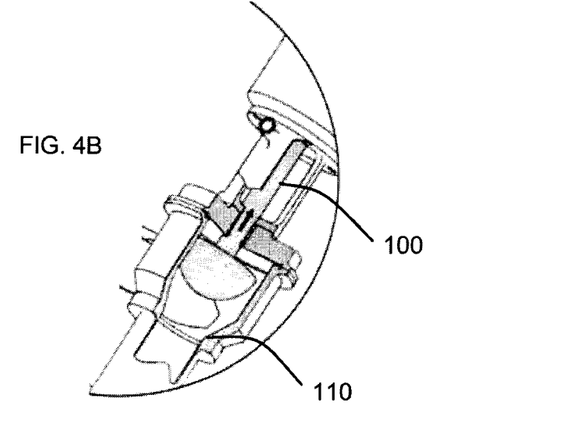

An example of an implementation using the valve stem is illustrated in FIGS. 4A and 4B, which illustrates a portion of a fluid handling system using the valve stem. In the system, the elongated stem 90 of the valve stem is engaged with a compressed air actuator configured to move the valve stem 100 back and forth within a passageway. The passageway includes a valve seat 110, and movement of the valve stem 100 causes the head 10 of the valve stem, and its elastic dome-shaped covering 70 to move into (FIG. 4A) and out of (FIG. 4B) sealing engagement with the valve seat 110 to selectively block or permit flow through the portion of the passageway defined by the valve seat 110.

Figure 5:
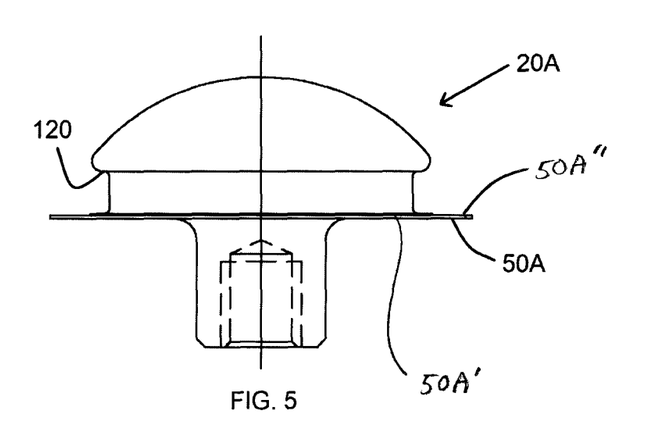
FIG. 5 is a cross-sectional view of a head of the valve stem according to an embodiment of the present application prior to bonding cover material onto the head.

The PTFE material is bonded to the valve body 20 to form the dome-shaped covering 70 by compression molding the PTFE material onto the valve body 20 and then sintering the valve body 20/PTFE covering to form the valve head 10 illustrated in FIG. 2. Before compression molding the PTFE material to the valve body 20 and before sintering, a valve body 20A as shown in FIG. 5 is provided, in which the disc-shaped flange portion 50A is flat or planar. The disc-shaped flange portion 50A includes a radially inwardly located part 50A' and a radially outwardly located part 50A". As shown in FIG. 5, the radially outwardly located part 50A" is radially outward of the radially inwardly located part 50A'. The thickness of the radially outwardly located part 50A" is less than the thickness of the radially inwardly located part 50A'. That is, the radially inwardly located part 50A' is thicker than the radially outwardly located part 50A".

The valve body shown in FIG. 5 is positioned in a suitable mold to carry out the compression molding. The PTFE material, which may be provided in powder or pellet form, is compression molded onto the valve body 20A shown in FIG. 5 such that the PTFE material is compressed into a channel defined by the disc-shaped flange portion, the cylindrical portion, and a flat face 120 of the dome-shaped portion. The mold in which the compression molding takes place is suitably configured to produce the dome-shaped or hemispherically-shaped covering 70, or other suitable shape as discussed previously above (e.g., truncated hemispherical/dome shape).

After the PTFE material is compression molded to the valve body 20, the valve head 10 (i.e., the valve body 20 and the PTFE material) is preferably sintered to coalesce the PTFE material forming the covering 70. This sintering may be accomplished by heating the valve body 20 and the PTFE material (i.e., the valve head 10) to a temperature above the crystalline melting-point of the PTFE material and for a time sufficient to cause the individual PTFE particles to coalesce and lose their identity. The sintering may be carried out a temperature of approximately 680° F.-716° F. (approximately 360° C.-380° C.). Following the heating of the valve head to coalesce the individual PTFE particles, the valve head is cooled. By compressing the PTFE material into the channel (i.e., the channel defined by the disc-shaped flange portion 50A, the cylindrical portion, and the flat face 120 of the dome-shaped portion) and then sintering, the dome-shaped covering 70 is mechanically connected to the valve body 20. Furthermore, the above-discussed configuration of the valve body 20 and the covering 70 can help ensure that there will be no gaps between the valve body 20 and the dome-shaped covering 70 which could otherwise undesirably trap contaminants.

The valve body 20 forming a part of the valve head 10 shown in FIG. 2 is configured so that the valve body includes a recess. In the illustrated example, the recess in the valve body is defined by the cylindrical portion 40. This recess is a part of the valve body 20 that is of smaller size or smaller outer dimension. In the illustrated embodiment representing one example of the inventive valve stem disclosed here, the flange portion 50 is an example of a flange (enlarged flange) at one axial end of the recess and the dome-shaped portion 30 is an example of a disk (enlarged disk) at the other axial end of the recess. Thus, the valve body includes the recess of reduced size or reduced outer dimension, the disk at one axial end of the recess and the flange at the opposite axial end of the recess. The recess in the valve body 20 receives a part of the PTFE covering 70 so that a mechanical connection exists between the PTFE covering 70 and the valve body 20. The entirety of the flange (flange portion 50), including the outermost portion, may cover (overlie) and be in direct contact with the lower surface of the PTFE covering 70 as depicted in FIG. 3 so that the entire lower surface of the PTFE covering may be covered by the flange. Thus, viewing the flange from the bottom in FIG. 3 (i.e., from the end of the elongated stem 90 in FIG. 3), the PTFE covering 70 cannot be seen because the PTFE covering 70 is covered by the flange. As shown in FIG. 3, the outermost extent of the flange and the outermost extent of the PTFE covering may be coincident (i.e., the outermost diameter of the PTFE covering 70 may be equal to the outermost diameter of the flange).

The mechanical connection between the PTFE covering 70 and the valve body 20 occurs by virtue of the reduced outer dimension of the cylindrical portion 40 relative to the overlying dome-shaped portion 30. This creates an undercut (or recess as described above) in the valve body 20 that is filled by the PTFE material during the compression of the PTFE material to the valve body 20. The PTFE material forming the covering 70 is thus mechanically held or mechanically attached/connected to the valve body 20 to form the valve head 10. This mechanical connection of the PTFE covering 70 to the valve body 20 is preferably the only connection of the PTFE covering 70 to the valve body 20. Thus, according to a preferred embodiment for example, the PTFE covering 70 is not chemically bonded to the valve body 20, and there is no adhesive or the like between the PTFE covering 70 and the valve body 20.

After the PTFE material is compression molded to the valve body 20, and after the combination of the valve body 20 and the PTFE material forming the covering 70 is sintered, the valve body 20 and PTFE material are cooled and are then machined to the desired dimensions. Part of this machining involves bending or curving the thinner radially outwardly located part 50A" of the disc-shaped flange portion 50 toward the PTFE material forming the dome-shaped covering 70 to accommodate shrinkage of the PTFE material that may occur during manufacturing (e.g., during sintering/cooling) which might otherwise result in a gap (relatively small) between the PTFE material and the valve body 20. The thinner radially outwardly located part 50A" of the disc-shaped flange portion 50A allows the radially outwardly located part 50A" of the disc-shaped flange portion 50A to be more easily bent or curved toward the PTFE material. FIGS. 2 and 3 show the thinner radially outward part 50' of the disc-shaped flange portion 50 that is bent or curved relative to the thicker radially inward part 50" of the disc-shaped flange portion 50.

The valve stem disclosed here, by virtue of the PTFE material forming the seat-engaging covering 70, is much better able to withstand a harsh environment and extreme conditions compared to known valve stems which utilize rubber as the seat-engaging material. The PTFE material can withstand repeated exposure to steam, harsh chemicals and other severe conditions, thus providing an attractive alternative to known valve stems with a seat-engaging part made of rubber. As an example, valve stems with a rubber seat-engaging part needed to be replaced about every three months on average. In the same environment, valve stems with a PTFE seat-engaging part showed no signs of damage, degradation or the like after three months, thus evidencing the superior nature of the inventive valve stem.

The preferred PTFE material used here is slightly compressible and thus able to engage the valve seat in a way that provides the desired seal against the seat. The preferred PTFE material used here exhibits reduced cold flow and also exhibits memory, meaning the PTFE material is able to return toward, or possibly to, its original configuration/shape after being slightly compressed when pressed against the valve seat.

The valve stem disclosed here has useful application in a wide variety of settings and environments in which damage to traditional rubber valve heads is a problem. The valve stem disclosed here may be used in material handling systems such as those used to process food (inclusive of beverages, dairy products, etc.), pharmaceuticals, consumer care products and the like, particularly such material handling systems in which CIP and/or SIP cleaning or sterilization is performed.

The detailed description above describes a valve stem with a head covered by covering material and a method of making the valve stem. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A valve stem movable into engagement with a valve seat of a valve to close a passageway defined by the valve seat and prevent fluid flow through the passageway and movable out of engagement with the valve seat of the valve to open the passageway defined by the valve seat to permit fluid flow through the passageway, the valve stem comprising:
   a one-piece valve body made of metal, the one-piece metal valve body including a portion that is recessed to define a recess in the valve body, the recess possessing opposite axial ends, the one-piece metal valve body also including a disk positioned at one of the axial ends of the recess and a flange positioned at the other of the axial ends of the recess, the recess being positioned axially between a portion of the disk and a portion of the flange, the flange and the disk each including an outermost portion, the outermost portion of the flange extending outwardly beyond the outermost portion of the disk;
   an elongated stem connected to the valve body and extending in a direction away from the flange, the outermost portion of the flange and the outermost portion of the disk extending outwardly beyond an outermost portion of the elongated stem; and
   a covering compression molded onto the valve body, the covering made of a material different from and more elastic than the metal forming the one-piece valve body, the covering comprising polytetrafluoroethylene, the covering comprised of the polytetrafluoroethylene entirely covering the disk, a portion of the covering comprised of the polytetrafluoroethylene being positioned in the recess to mechanically connect the covering to the valve body, the outermost portion of the flange being in direct contact with the covering comprised of the polytetrafluoroethylene.

2. The valve stem of claim 1, wherein the metal forming the one-piece valve body comprises steel.

3. The valve stem of claim 1, wherein the outermost portion of the flange is thinner than a portion of the flange positioned inwardly of the outermost portion of the flange.

4. The valve stem of claim 1, wherein the valve body further includes a connection portion projecting axially away from the flange, the elongated stem being connected to the connection portion.

5. The valve stem of claim 4, wherein the connection portion comprises a hollow cylinder defining a female thread threadedly connected to a male thread of the elongated stem.

6. The valve stem of claim 1, wherein the outermost portion of the flange is bent or curved toward the covering.

7. A valve head engageable with a valve seat of a valve to close a passageway defined by the valve seat and prevent fluid flow through the passageway and movable to be disengaged from the valve seat of the valve to open the passageway defined by the valve seat to permit fluid flow through the passageway, the valve head comprising:
   a valve body made of a first material and including a dome-shaped portion, a cylindrical portion, and a flange portion, the cylindrical portion being positioned axially between the dome-shaped portion and the flange portion;
   the dome-shaped portion, the cylindrical portion and the flange portion each possessing an outermost diameter;
   the outermost diameter of the dome-shaped portion being greater than the outermost diameter of the cylindrical portion and less than the outermost diameter of the flange portion;
   the dome-shaped portion being disposed at a first end of the cylindrical portion and the flange portion being disposed at a second end of the cylindrical portion opposite the first end so that the cylindrical portion is positioned axially between the dome-shaped portion and the flange portion; and
   a covering made of a second material, the second material being more elastic than the first material, the covering being compression molded onto the valve body and entirely covering the domed-shaped portion and the cylindrical portion.

8. The valve head of claim 7, wherein the first material comprises steel.

9. The valve head of claim 7, wherein the second material comprises polytetrafluoroethylene.

10. The valve head of claim 7, wherein the valve body further includes a connection portion disposed at the second side of the cylindrical portion, the connection portion being configured to connect the valve head to an elongated stem.

11. The valve head of claim 10, wherein the connection portion comprises a hollow cylinder that includes a female thread.

12. The valve head of claim 7, wherein the flange portion possesses an outer periphery that is bent or curved toward the covering and in direct contact with the covering.

* * * * *